I. HILL.
PLANT PROTECTOR.
APPLICATION FILED NOV. 5, 1909.
1,043,594.
Patented Nov. 5, 1912.
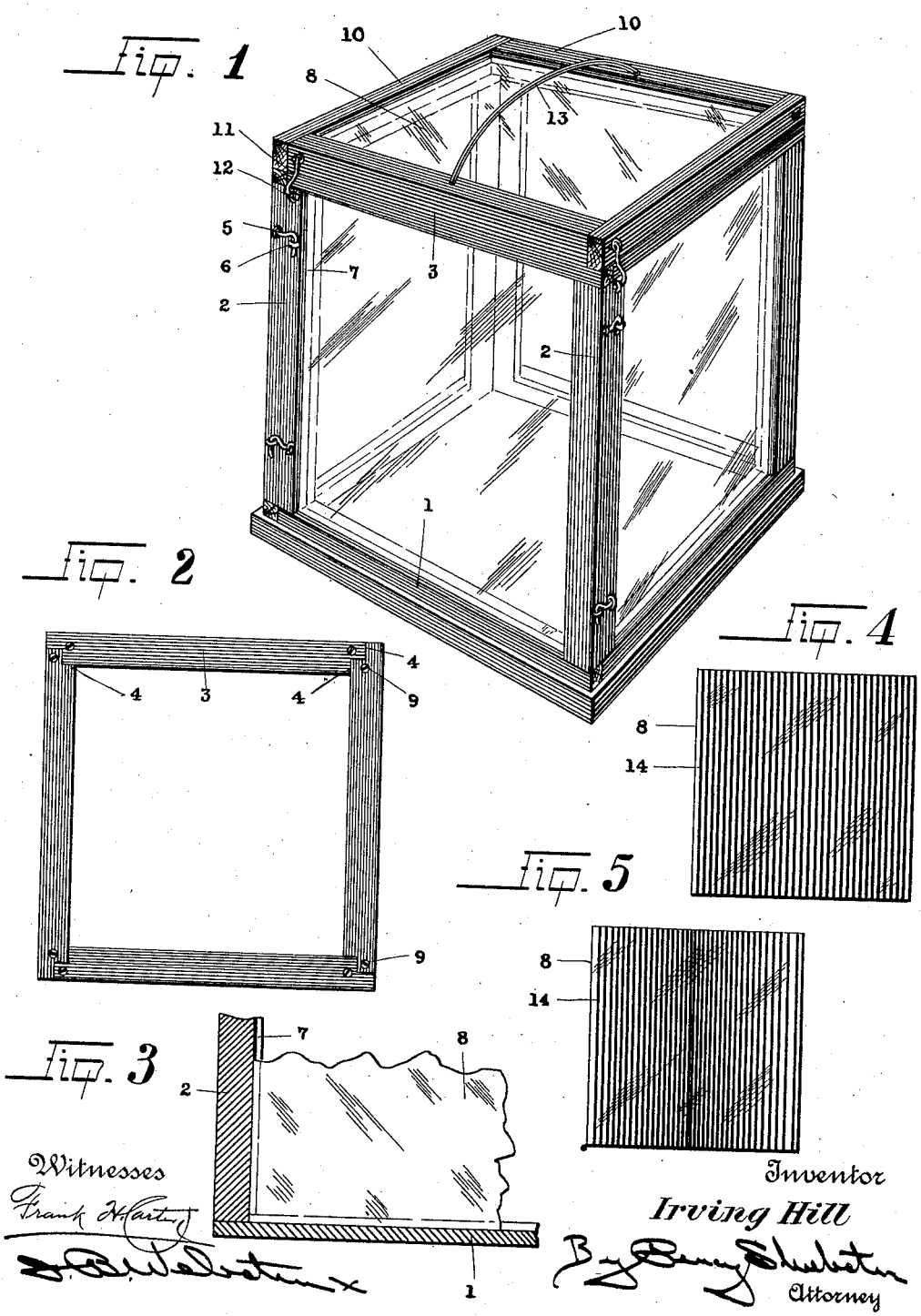
Inventor
Irving Hill

UNITED STATES PATENT OFFICE.

IRVING HILL, OF WALLACE, CALIFORNIA.

PLANT-PROTECTOR.

1,043,594.

Specification of Letters Patent.  Patented Nov. 5, 1912.

Application filed November 5, 1909. Serial No. 526,324.

*To all whom it may concern:*

Be it known that I, IRVING HILL, a citizen of the United States, residing at Wallace, in the county of Calaveras and State of California, have invented certain new and useful Improvements in Plant-Protectors; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in garden equipment and particularly to a means for protecting young or other plants in cold weather, the object of the invention being to produce a plant protector which will protect the plants from the north or cold side and yet admit warmth and light from the south or warm side and so graduate such warmth and light as to give a greater amount in the morning than the middle of the day when the heat might be too great.

A further object of the invention is to produce such a plant protector as will be collapsible and capable of being packed in a small and compact bundle when not in use.

I also aim to produce a simple and inexpensive device and still one which will be exceedingly effective for the purposes for which it is designed.

These objects I accomplish by means of such structure and relative arrangement of parts as will more fully appear by a perusal of the following specification and claim.

In the drawings similar characters of reference indicate corresponding parts in the several views.

Figure 1 is a perspective view of the complete device. Fig. 2 is a top plan view of the lower portion of the device. Fig. 3 is a sectional view of a fragmentary portion of one corner of the device. Fig. 4 is a front elevation of one of the glasses used in the device showing paint strips thereon. Fig. 5 is a view similar to Fig. 4 showing the paint strips differently arranged on the glass.

Referring now more particularly to the characters of reference on the drawings the body of the plant protector comprises independent side members composed of base members 1, side members 2 and top members 3, the edges of said sides being grooved as at 4 and in such manner that adjacent ones of said independent side members mortise into each other where they may be locked by hooks 5 and eyes 6.

The inner edges of the members 1, 2 and 3 are slotted as at 7 to receive a glass 8, the members 3 being placed in position over the members 2 after the glass is inserted and then removably secured by screws 9.

The top of the device is formed of four side members 10 constructed and provided with glass as are the independent side members and is secured to said side members by hooks 11 and eyes 12 and is provided with a carrying handle 13.

In practice when placed over a plant the glass sides protect the plant from the cold on the north or cold side and yet admit the light and warmth from the south or warm side, the quantity of heat and light being graduated by the number and position of the paint strips 14, as for instance, in Fig. 5 the paint strips are closer together in the center than on the outer edges, thus allowing more heat and light to enter in the morning and evening when the sun's rays are obliquely disposed and of less effect and shutting off the midday rays which strike the glass directly and are of greater intensity.

When the plant protector is not in use, the independent side and top members may be unhooked one from the other and piled away in a neat and compact manner, and if desired the glasses can be removed by removing the screws 9 and removing the tops 3.

From the foregoing description it will be readily seen that I have produced such an invention as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A plant protector comprising side and top frame members, a glass in each of the sides and top of said protector, one of said glasses having a plurality of non-transparent strips painted thereon, said strips being close together at the center of said glass and being gradually disposed farther apart toward the edges of said glass, as described.

In testimony whereof I affix my signature in presence of two witnesses.

IRVING HILL.

Witnesses:
PERCY S. WEBSTER,
JOSHUA B. WEBSTER.

Copies of this patent may be obtained for five cents each, by addressing the "Commissioner of Patents, Washington, D. C."